No. 685,847. Patented Nov. 5, 1901.
H. F. JONES.
SWITCHBOARD FOR TELEPHONE OR LIKE EXCHANGES.
(Application filed Apr. 7, 1900. Renewed Mar. 15, 1901.)
(No Model.) 3 Sheets—Sheet 1.
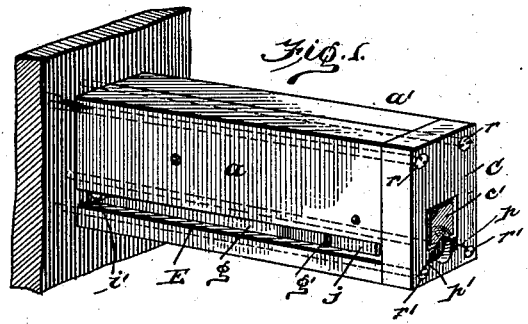
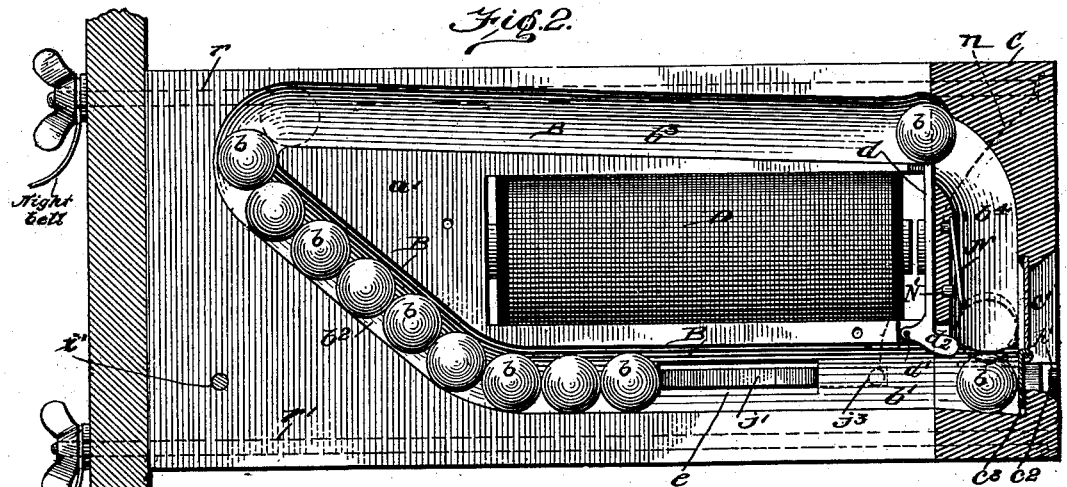
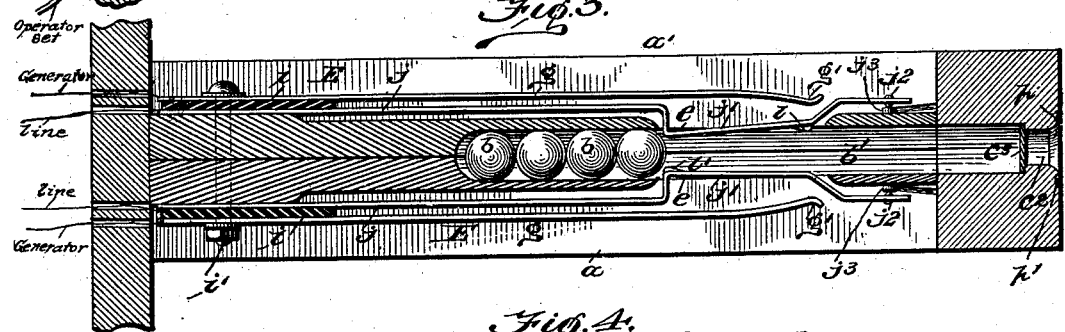
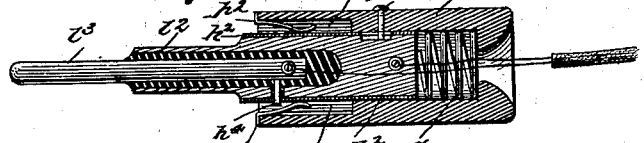
WITNESSES:
H. G. Dieterich
John E. Burch
INVENTOR
Howard Feild Jones
BY Johnson & Johnson
ATTORNEYS
THE NORRIS PETERS CO., PHOTO-LITHO., WASHINGTON, D. C.

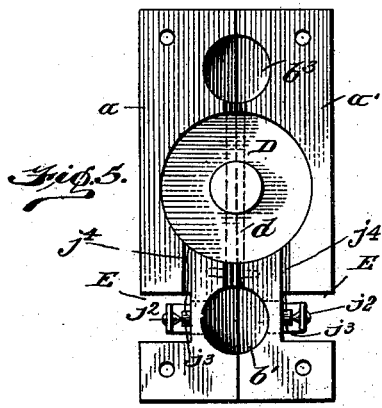
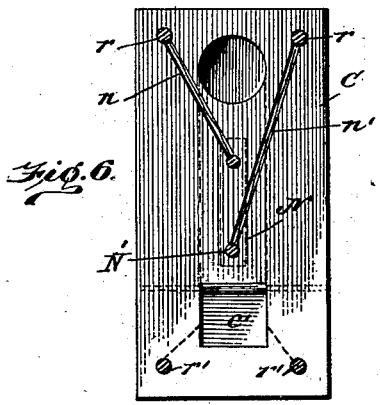
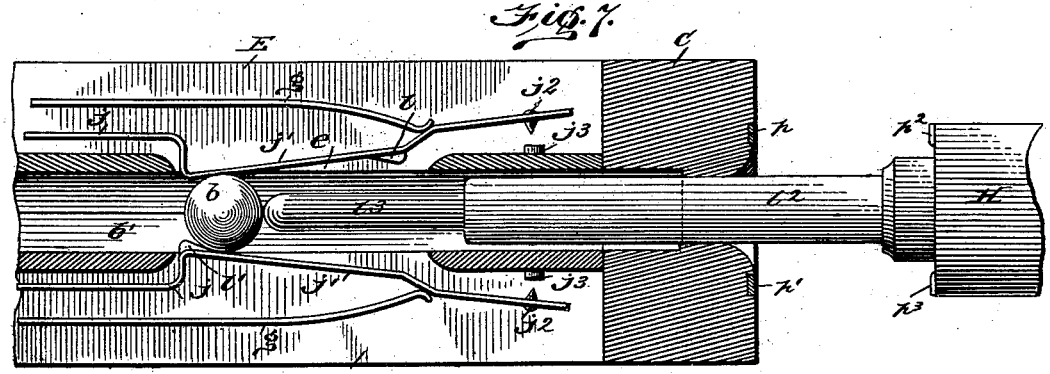
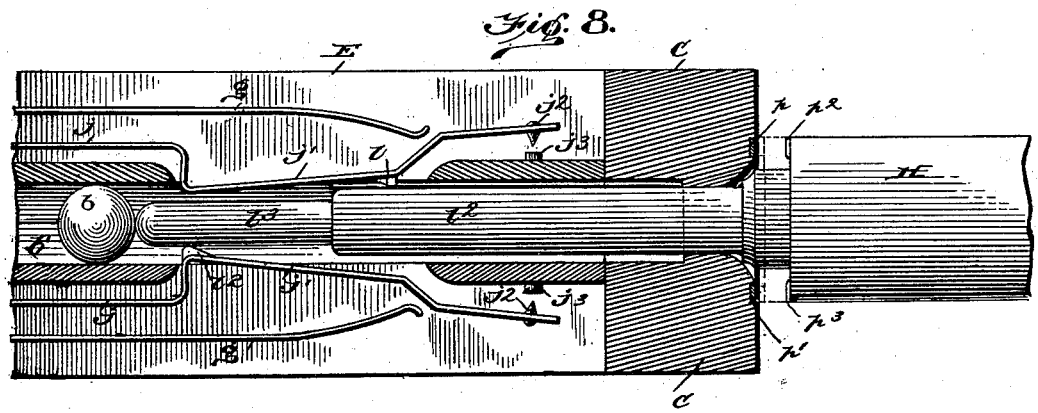

No. 685,847. Patented Nov. 5, 1901.
H. F. JONES.
SWITCHBOARD FOR TELEPHONE OR LIKE EXCHANGES.
(Application filed Apr. 7, 1900. Renewed Mar. 15, 1901.)
(No Model.) 3 Sheets—Sheet 3.
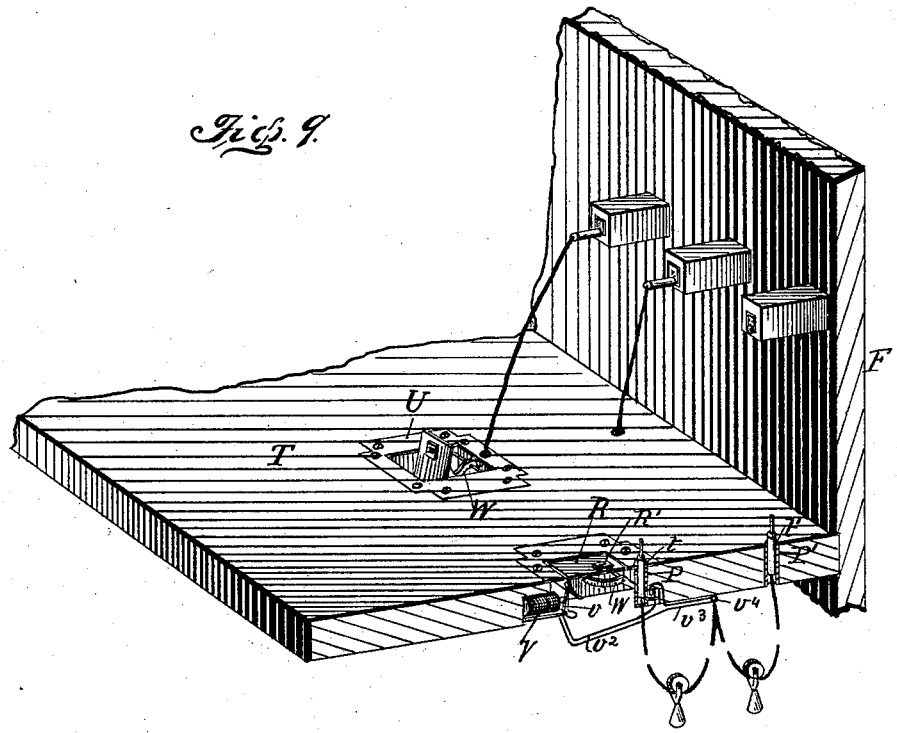
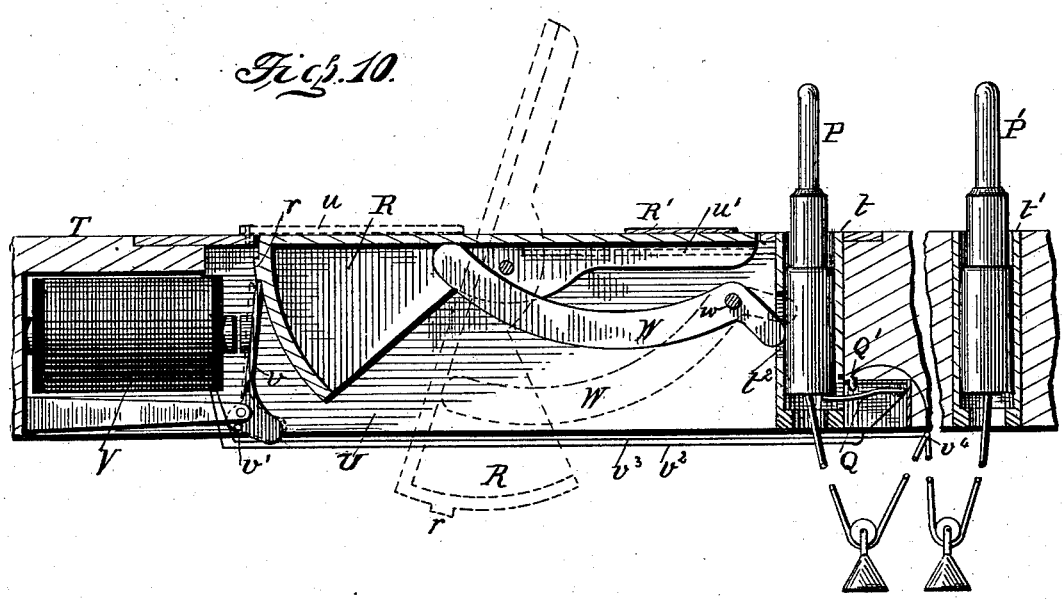

UNITED STATES PATENT OFFICE.

HOWARD FEILD JONES, OF WILSON, NORTH CAROLINA.

SWITCHBOARD FOR TELEPHONE OR LIKE EXCHANGES.

SPECIFICATION forming part of Letters Patent No. 685,847, dated November 5, 1901.

Application filed April 7, 1900. Renewed March 15, 1901. Serial No. 51,350. (No model.)

*To all whom it may concern:*

Be it known that I, HOWARD FEILD JONES, a citizen of the United States, residing at Wilson, in the county of Wilson and State of North Carolina, have invented certain new and useful Improvements in Switchboards for Telephones or Like Exchanges, of which the following is a specification.

The following description, read in connection with the drawings, will enable any one skilled in the art to which my invention relates to understand its nature and to practice it in the form in which I prefer to employ it; but it will be understood that my invention is not limited to the precise form herein illustrated and specified, as various modifications and equivalent changes may be made and adapted by the skilled constructor to carry out my invention.

Referring to the accompanying drawings, Figure 1 illustrates in perspective one of my combined spring-jacks and annunciators, a number of which constitute the switchboard. Fig. 2 is an interior side view of one of the halves of the frame, the face-plate being shown in central vertical longitudinal section, and shows the relative positions of the endless ball-raceway, magnet, and spring-jack. Fig. 3 is a horizontal section of Fig. 2, taken on the axial line of the spring-jack, the half of the frame which was removed in Fig. 2 being restored, showing the position of the line and generator contact-springs in their normal position, the line contact-springs $j$ being shown as normally in circuit with the annunciator. Fig. 4 is a section of my improved contact-plug for use with my switchboard. Fig. 5 is a front view of the frame or box, the face-plate being removed. Fig. 6 is a rear view of the face-plate, showing the connection for the night-bell or auxiliary-signal contacts. Fig. 7 is an enlarged horizontal section similar to Fig. 3, partly broken away and showing the operation of the ball, plug, and spring-jack when ball is spreading the projections $j'$ $j'$ of spring-jack, the connections of the terminals being shown in position for "ringing up" a "called" subscriber. Fig. 8 is a similar view to Fig. 7, showing the connections of the terminals in position for talking between two subscribers. Fig. 9 shows in perspective a portion of my switchboard, and Fig. 10 is a section of the same taken through the clearing-out signal mechanism.

It is usual to employ in a telephone-exchange an annunciator, a spring-jack or plug-socket, a plug having two contact-terminals, and several switches which must be operated by the operator in conjunction with the plugs to establish the talking-circuit between two subscribers and for connecting operator's set for listening and ringing. The disadvantage of having so many switches at separate and distant positions to manipulate is obvious. Several devices are in use which by the use of specially-constructed plug and generator contacts manipulated by said plugs a subscriber may be rung up; but they necessitate the insertion of the plug to its greatest extent in order to force generator-contacts and then the return of said plug by a spring to its normal line-contact position. Also I am aware that drop or shutter signals are in use that have provision for being "restored" upon the insertion or withdrawal of the plug; but I am not aware of any device such as my present improvement whereby a dust-proof casing contains a visible appearing signal-ball traveling in an endless raceway, which signal is employed to trip the armature to hold contact-springs of line-wire in connection with generator-springs to ring telephone-bells and to hold said line-springs from contacting with inserted plug until connection with generator-spring is broken, and means carried within the sleeve or covering of said plug whereby a talking-circuit is established between subscriber's telephone and the operator's telephone and such circuit broken automatically when the operator ceases to exert a forward movement of said sleeve.

My indicator or annunciator device, as shown in Figs. 1 and 2, consists of a two-part frame or casing $a\ a'$, having an endless interior passage or ball-raceway B, with a bottom horizontal arm $b'$, a rearward upwardly-inclined arm $b^2$, and an upper frontward downwardly-inclined arm $b^3$. A face-plate C is secured to the front of the frame and has a vertical bore or passage $b^4$, which forms a continuation of the ball-raceway and connects its upper arm $b^3$ and its lower arm $b'$. Centrally longitudinally of the two-part frame and between the upper and lower arms of the raceway is a cavity containing an electromagnet D, whose armature $d$ is at its forward end, is hinged below at $d'$, and projects above normally into the path of the nonconducting balls or drop-signals $b\ b\ b$, which move in the raceway B. At its hinged end the armature has a lug $b^2$, projecting into the lower horizontal arm of the raceway for a purpose hereinafter explained. A spring jack projects into the lower arm of the raceway and retaining back of its rear projecting shoulders a sufficient number of balls to fill the inclined arm $b^2$ of the raceway. One ball is normally held at the forward end of the upper arm $b^3$ of the endless raceway by the projecting top of the armature $d$, and another ball is normally held at the bottom of the vertical arm $b^4$ of the raceway, the bottom of the raceway at this point being slightly inclined and keeps the ball from being jarred back.

When a subscriber rings up the exchange, the electromagnet is energized and pulls its armature from beneath the ball which it normally retains and allows said ball to drop down through the passage $d^4$ in the face-plate, and it falls and rests on the ball normally held at the bottom of said passage and against a glass window $c'$ and constitutes a perfect visible appearing signal, which the operator may instantly and plainly see through said window. The plug socket or orifice $c^2$ is located just below the window $c'$ and just in line with the lower arm of the raceway. Between the ball normally held at the forward end of the lower arm of the raceway and the orifice $c^2$ is a shutter $c^3$, which is made of some dark or other colored material which will contrast with the color of the ball seen through the window above, and thereby make the signal more efficient. Upon the appearance of the ball at the window the exchange-operator inserts one of a pair of connecting-plugs into the orifice $c^2$ and pushes the shutter back and also the ball normally held just behind it; but it does not dislodge the ball just dropped, as such ball is held up by the shutter in readiness to drop and take the place of the ball dislodged by the plug upon the withdrawal of the plug. The plug continues to push the first ball back through the lower arm of the raceway and past the projecting spring-jack until the ball meets the balls retained in the incline. It now pushes these balls up the incline and lifts the top one, as shown in dotted lines in Fig. 2, into the upper arm of the raceway, which is inclined downward. This ball now rolls down toward the front and is caught by the projecting top of the armature $d$ and retained, as was the ball which preceded it in the raceway. The insertion of the plug makes electrical connections, as hereinafter explained, and enables the operator to ascertain the number of the subscriber desired. The operator then inserts the other of the pair of connecting-plugs into the plug-orifice of an identical combined annunciator and spring-jack belonging to the line of the telephone to be called up and establishes the circuit between the two subscribers.

In inserting the plug for the telephone which is "called up" it is necessary, since the magnet would not be energized, to mechanically throw down a ball to be in readiness to take the place of the ball which the plug dislodged. I accomplish this by the provision of an arm or lug $d^3$, projecting from the lower end of the armature into the path of the ball dislodged by the plug. The ball in passing lifts said lug and mechanically forces its armature toward the magnet, and thus dislodges the ball, which is normally held at the top of the vertical passage $b^4$, so that when the plug is withdrawn said ball may fall and lodge behind the shutter in readiness for the next insertion of the plug. The plug being of less diameter than the balls will not affect or operate the lower projecting arm $d^2$ of the armature except through the instrumentality of the ball. Thus it will be seen that the indicator of my annunciator, which is the falling ball, is perfectly reset or restored upon the insertion of the plug and not by any movement of the operator other than that required to insert the plug.

Longitudinal recesses or slots E E are let into the outer sides of each frame part $a\ a'$ and run parallel to and in the same horizontal plane with the lower horizontal arm of the interior ball-raceway. An arm of the spring-jack is fastened in each of these slots E E, and through the openings $e\ e$ in the walls between the slots and interior raceway the spring-jack partially projects into the horizontal arm of the raceway for a purpose presently stated. The spring-jack consists of the line spring-arms $j\ j$, having bends or shoulders $j'\ j'$, projecting through the openings $e\ e$ into the horizontal arm of the raceway, and the generator spring-arms $g\ g$, which lie parallel to the line spring-arms and on their outer sides. One line spring-arm and one generator spring-arm are fastened at one end in each slot E and are insulated from each other at their fastened end by a separating and insulating plate $i$, Fig. 3. A bolt $i'$ securely fastens them in the slots E. The free ends $g'$ of the generator spring-arms normally stand separated from the line spring-arms $j\ j$ by only a little distance, so that the plug pushes the ball between the projecting shoulders $j''\ j''$ of the line spring-arms and spreading them forms the contact at the free end $g'$ of the generator spring-arm $g$. The free ends $j^2\ j^2$ of the line spring-arms normally contact with the annunciator-contacts $j^3\ j^3$, and this contact is broken and held so long as a ball or plug is between the projecting shoulders $j'$ of the line spring-arms, Figs. 7 and 8. The ball is of greater diameter than the plug, and when it is pushed between the projecting shoulders $j''\ j''$ of the line spring-arms it contacts them with the generator spring-arms $g\ g$ at $g'\ g'$, Fig. 7, making a wiping contact. The diameter of the plug is not sufficient to maintain this contact, but is sufficient to break the contacts of the line spring-arms with the annunciator-contacts at $j^2 j^2$. (See Fig. 8.) The line-wires are fastened to the line spring-arms $j j$, and the generator-wires are fastened to the generator spring-arms $g g$ at their rear ends in any suitable manner. A pair of connecting-plugs having two terminals are used in conjunction with the spring-jack of the subscribers' telephones to establish communication between the subscribers and between each of them and the exchange-operator's telephone and to make the necessary signaling-calls.

For the purpose of connecting the operator's set of receiver and transmitter my plug embodies features hereinafter particularly described.

The construction of my spring-jack may be best described by a description, step by step, of its operation and functions.

The annunciator devices stand normally as shown in Fig. 2, a ball being retained by the armature at the top of the vertical arm $b^4$ of the raceway and another ball at the bottom, just behind the shutter $c^3$. The subscriber's line is in circuit, Fig. 3, with the annunciator-coil at $j^3 j^3$ through the short wires $j^4$, (shown in Fig. 5,) and when the calling subscriber rings the magnet is energized and releases its retained ball, which drops down the vertical arm $b^4$ of the raceway and lodges upon the bottom ball in the position shown in light dotted lines in Fig. 2 and is a perfect-appearing signal to be seen through the window $c'$ in the face-plate. The operator then takes one of a pair of connecting-plugs and inserts it in the socket to answer the caller. The plug pushes the shutter back and holds the ball just dropped up and continuing to push the ball formerly held on the incline just behind the shutter, which ball on arriving at the position shown in Fig. 7 will spread the line spring-arm $j j$ and make contact thereof with the generator spring-arm $g g$, the result of which will be a ring on the telephone of the subscriber who has called. This may be undesirable, but as the length of the ringing depends upon the length of time the ball takes in passing over the projecting shoulders $j' j'$ of the line spring-arms it is obvious that a quick insertion of the plug would only cause a slight ring, which I do not think would be very disagreeable and the objection to which would be obviated altogether if the calling subscriber kept his receiver on hook until such slight ring had ceased and which can be advantageously employed as an automatic return-signal, and thus obviate the holding of the receiver to the ear—always tedious when waiting for operator. When the plug, which is of less diameter than the ball, pushes the ball past the rear ends of the projecting shoulders $j' j'$ of the line spring-arms, said arms will spring toward the plug, and a hump $l$ on one of the line spring-arms will contact with a terminal contact-surface $l^2$ on the plug, and a hump $l'$ on the other line spring-arm will contact with another terminal contact-surface $l^3$ on the plug. It is evident that no generator-current can come in contact with the plug while the "ball" is ringing the telephone of a subscriber "wanted" or "calling." Certain other contacts $p$ $p'$ $p^2$ $p^3$, Fig. 8, as hereinafter explained, establish talking communication between the subscriber calling and the exchange-operator, and the operator then ascertains the number of the telephone with which the calling subscriber wishes communication. The insertion of the plug has placed another ball in the upper inclined arm of the raceway, and said ball, rolling forward, is retained by the armature, as before explained, which restores the signaling mechanism. Having ascertained the number of the telephone desired, the operator takes the other of the pair of plugs and inserts it into the socket of the combined spring-jack and annunciator belonging to that telephone which is identical in construction with the combined spring-jack and annunciator of the calling-telephone. The balls in the raceway are in the positions shown in full lines in Fig. 2. As the magnet of the called telephone has not been energized, the top ball will not fall; but it is necessary that the top ball should fall, for the reason that when the plug is pushed home it throws another ball into the upper inclined arm $b^3$ of the raceway, which would make two balls held by the armature, neither of which would be released to take the place of the ball just dislodged from behind the shutter by the plug. To obviate this, I provide for mechanically throwing the upper ball by the passage of the lower ball pushed by the plug under the projecting bottom lug $d^2$ of the armature. This lifts the lug $d^2$ and trips the ball held at the top of the armature and allows the ball to fall down on the upraised shutter $c^3$ to the position shown in heavy dotted lines in Fig. 2. After the ball gets past the lug $d^2$ the lug drops back and the armature is reset. The plug is of less diameter than the ball and does not touch or affect this lug $d^2$. It is of course necessary that the telephone to be called should be "rung up," and this I do by pausing in inserting the plug just when the ball has arrived at a point in its passage between the projecting shoulders $j' j'$ of the line spring-arms, as shown in Fig. 7. When the ball arrives at this point, the annunciator connection at $j^3 j^3$ has been broken, but the connection between the generator spring-arms and the line spring-arms, as shown in Fig. 7, is established, the result of which will be to "ring up" the telephone called. The ball may be held or paused at this point to give a sufficient ringing on the telephone called, and the operator pushes the plug farther in, as seen in Fig. 8, and the complete talking-circuit is made between the two subscribers through the pair of connected plugs. Another ball is pushed into the upper inclined arm $b^3$ of the ball-raceway and is retained by the top of the armature to restore the annunciator device.

It is necessary that provision be made for the operator to listen or talk to the subscribers for the purpose of ascertaining the number of the telephone wanted and also to ascertain when the subscribers have finished talking. For this last purpose I will also employ a "ring-off" or clearing-out signal, presently described.

To connect the operator's telephone-set for talking and listening, I have devised a new arrangement of terminal-contacts which are made and broken by the plug.

My new plug, as shown in Fig. 4, consists of the ordinary metallic plug, the two contacts $l^2$ and $l^3$ of which are insulated from each other in the usual manner. An outer casing H telescopes upon the handle end of the plug and is retained thereon by a pin $h$, working in slot $h'$. Interposed between the interior end wall of the casing and the end of the plug is a spring S, which acts to normally hold the plug and casing extended. A metal sleeve $h^2$, in electrical contact with the contact-surface $l^2$ of the plug, is interposed between said contact-surface $l^2$ and the outer casing for the purpose of protecting the insulated ends of the cord-wires. At the inner end of the casing are secured two contact-springs $p^2$ $p^3$, which extend back into recesses $h^3$ in the outer casing and one of which, $p^2$, is in constant electrical connection with the contact-surface $l^2$ of the plug. The other contact-spring $p^3$ is normally held out of contact with the pin $h^4$ (which leads from the contact-surface $l^3$ of the plug through the contact part $l^2$ and is insulated therefrom) by the spring S; but upon the compression of the plug-casing such contact is made, for a purpose presently explained. Just at the mouth of the plug-orifice are two contact-plates $p$ $p'$, which are connected to the lower supporting-rods $r'$ $r'$, as shown in Fig. 1. From the rear ends of each of these rods $r'$ $r'$ wires lead to the operator-set. Now in order to establish a talking-circuit between the operator's set and the subscriber the operator pushes the plug clear home and compresses the outer casing, which makes electrical connection between the contact-plates $p$ $p'$ upon the face-plate C and the contact-springs $p^2$ $p^3$ upon the inner end of the plug-casing, and also the said contact-spring $p^3$ slides up on the pin $h^4$ and completes the operator's talking-circuit through the plug with the line of the subscribers, as shown in Fig. 8, in which the compressed position of the plug-casing is shown in dotted lines. In order to break this connection, the operator has simply to release the pressure on the plug-casing, and the spring S will force the casing back and automatically break all contact between the operator's set and the subscriber.

Another feature of my invention is the provision of the operator's night-bell or auxiliary signal. At the back of the vertical arm $b^4$, Fig. 2, of the raceway I fasten a delicate spring-plate N, which normally hangs out in the path of the falling ball, and under the hanging end of this spring-plate is fastened upon the wall of said raceway a contact-plate N'. From the upper end of the spring-plate N and from the contact-plate N' wires $n$ $n'$ lead up to and are connected to the upper supporting-rods $r$ $r$, as shown in Figs. 1 and 6. From the rear ends of these rods wires lead to the operator's night-bell or other auxiliary signal, such as a monitor-lamp, which may be used in the day-time as well. Now when the magnet is energized and a ball is tripped the ball drops down and presses the spring-plate N into contact with the contact-plate N' and rings the night-bell. This spring-plate N hangs down just far enough to be pressed against the contact-plate N, so long as the ball just dropped rests upon the ball normally held at the bottom of the passage; but when the plug pushes said ball out of the way the ball just dropped will be let down and allows the spring-plate N to break its contact with the plate N', and thus stop the ringing of the night-bell. The position of the ball for ringing is shown in the light dotted lines in Fig. 2. The position of the ball when resting on the shutter which is upheld by the plug is shown in the heavy dotted lines in Fig. 2 and from which it will appear that although the shutter is interposed between the ball and the plug yet the diameter of the plug is such as not to lift the ball sufficiently high to ring the bell.

My clearing-out signal mechanism also embodies novel features, which are illustrated in Figs. 9 and 10, in which T represents the usual table or shelf of the switchboard, the upright F of which carries the combined spring-jacks and annunciators of the subscribers' lines. P P' are two connecting-plugs which normally rest in seats $t$ $t'$ in the table or shelf T. The connecting-cord is secured at about the middle of its length to the under side of the shelf T at a point preferably between the two plug-seats. The hanging loops of the cord have weights to constantly hold the cord taut and also for drawing the plugs back into their seats when they are withdrawn from the jack above. The back row of plug-seats is preferably elevated for convenience in handling. That part of the table T immediately in front of the front row of plugs (which is usually occupied by the ringing and listening keys in other boards) is occupied in part by my new clearing-out signal. This consists of a bottomless box-like structure or casing U let into the table and flush with the top thereof. In the back part of this casing U is the seat $t$ for the plug P. In a rectangular opening just in front of the plug-seat $t$ is a flap or drop R mediately pivoted therein, weighted on its front half and normally held flush with the surface of the table. Situated in the front end of the casing U is an electromagnet V. This magnet V has attached at its rear end and within the influence of its core an armature $v$, which is hinged at its lower end and weighted to normally hold it away from its magnet and out under the projecting lug $r$ on the forward end of the pivoted drop R. A pin $v'$ near the hinge of the armature strikes its hinge-support and limits the backward swing of the armature. The magnet-coil is bridged upon the plug-cord at $v^4$ by its wires $v^2 v^3$, which are carried alongside of the casing or upon the under side of the table, as in Fig. 9. Pivoted at $w$ within the casing U and between the pivot of the drop R and the adjacent plug-seat $t$ is a lever W, the short end of which projects through an opening $t^2$ into said plug-seat and in the path of its contained plug. The long end of the lever W bears on the under side of the pivoted drop R, forward of its pivot, for a purpose presently explained. So long as the plug is in its seat $t$ the short end of the lever W will be held down, as shown in full lines in Fig. 10. Upon the withdrawal of the plug the short end of the lever, by reason of the weight of its long end, will rise until it meets the top of the slot or opening $t^2$ in the seat $t$, and the lever W will assume the position shown in dotted lines. The plugs being home in the jacks of the subscribers' lines and the magnet V being bridged on the plug-cord, as stated, any ring by either subscriber will energize the magnet V and cause its armature $v$ to release the weighted end of the pivoted drop R, which drop will assume the position shown in dotted lines, and the lighter or back end of the pivoted drop R being lifted up will indicate to the exchange-operator that the subscribers have rung off. A plate R', bearing a number or letter, is secured on the top of the rear or lighter end of the pivoted drop R, which designates the particular pair of plugs with which the drop is connected. After the subscribers have rung off the operator withdraws the plugs from the spring-jacks and the weights pull them back into their seats $t t'$. As the front plug is pulled down into its seat it depresses the short end of the lever W and its long end in rising will bear on the under side of the forward part of the pivoted drop and lift it up, so that the projecting lug $r$ will ride over the top end of the armature $v$ and be caught thereby, and thus reset the pivoted drop or clearing-out signal. Under some circumstances it is preferable that the electromagnet V be not constantly bridged on the cord-circuit, and for this purpose I provide for breaking such bridged connection upon the return of the plugs to their seats. The means shown is a spring-plate Q, forming one of the terminals of the circuit from one side of the magnet-coil and projecting into the plug-seat $t$ in the path of the descending plug, and a contact plate or point Q', from which a wire leads to the plug-cord, the arrangement of the spring-plate Q and contact Q', as shown in Fig. 10, being such that when the plug descends into its seat $t$ it will depress the spring-plate Q and break the circuit. When the plug is lifted from the seat $t$, the spring-plate Q will rise and contact with the point Q' and establish the circuit. Since the plugs in being pulled down from the jacks might possibly fall into the openings made by the turning of the pivoted drop and become tangled therein, I provide the plates $u$ $u'$, (shown in dotted lines in Fig. 10,) disposed, respectively, over and under the forward and rear ends of the pivoted drop R, but not in any way affecting the turning of said drop. These plates are omitted from Fig. 9 in order that the drawing may be clear.

It is obvious that in a grounded circuit one of the generator and one of the line springs can be dispensed with in my combined annunciator and spring-jack and make the balls of conducting material, so that when the ball is held between the line-spring and generator-spring the circuit will be from the telephone through line-spring, across ball to generator-spring, and along connecting-wire to generator and to earth and through earth back to telephone, so that so long as the ball is held in that position that generator will ring connecting-telephone, but will not ring back through the cord by reason of the diameter of the ball being greater than the plug, so that the line-contact is not made with the plug until the ball has passed beyond the generator-strip. In night-bell or auxiliary-signal circuit the balls would act as connection between two poles of springs leading to bell and battery.

I claim—

1. The combination in an annunciator, a casing, an endless ball-raceway therein having an approximately vertical arm or drop-passage and confining and guiding in column in constant succession a multiple of signal-balls each in turn forming a visual signal, an electromagnet, a detent-armature actuated by said magnet and adapted to arrest and release said visual signal-balls.

2. In a plug-restored annunciator for telephone and like exchanges, a casing, an endless ball-raceway confining and guiding in column in constant succession a multiple of balls each in turn forming a visual signal, an electromagnet, its armature projecting into said endless raceway and adapted to arrest and release the visual signal-balls.

3. In an annunciator for telephone and like exchanges a ball-raceway having a vertical arm and a horizontal arm, a multiple of independent signal-balls movable in said raceway in column, an electromagnet, an armature projecting into said raceway and normally retaining one of said signal-balls at the top of its said vertical arm, an inclined seat in the horizontal arm of the raceway one of said balls normally retained thereon, a lug on said armature projecting into said horizontal arm of the raceway in rear of its seated ball, in combination with a plug of less diameter than said balls adapted to be inserted into the horizontal arm of said raceway and pushing its contained ball cause it to trip the armature-lug and mechanically release its upheld ball.

4. A visual-signal annunciator consisting of a continuous ball-raceway having a front vertical arm, balls confined within said raceway an electromagnet its armature normally retaining a ball at the top of said vertical arm, a window near the bottom of said vertical arm of the raceway at which said top ball is displayed when released by the armature.

5. In an electric annunciator, the combination with a ball-raceway having a forward vertical arm, a window near the bottom of said vertical arm, a multiple of signal-balls confined within said raceway, an electromagnet, its armature normally retaining a signal-ball above said window, and adapted to release said ball when actuated by the magnet.

6. In an annunciator for telephone and like exchanges, a frame or box, an electromagnet centrally longitudinally disposed therein, a ball-raceway longitudinally surrounding said magnet having a lower horizontal portion or arm, a rearward upwardly-inclined portion or arm, an upper arm inclined downward toward the front and an approximately vertical arm connecting the front ends of the upper and lower arms, a multiple of plug-driven balls movable within said raceway in column one normally held at the front of said horizontal arm and an armature for said magnet normally holding another ball at the top of said vertical arm and adapted to release said ball when actuated by the magnet.

7. In an annunciator for telephone and like exchanges the combination of an electromagnet, an armature, an endless ball-raceway, line and generator spring-arms projecting into said raceway, a plug-driven ball movable in said raceway and adapted to spread said spring-arms, for the purposes and in the way stated.

8. In an annunciator for telephone and like exchanges a ball-raceway, an electromagnet, line spring-arms normally in electrical connection with said magnet, and projecting into said raceway, in combination with a plug-driven ball movable in said raceway and adapted to spread said spring-arms and break their electrical connection with said magnet.

9. In a switchboard for telephone and like exchanges a continuous ball-raceway, a multiple of balls movable in column therein, line spring-arms projecting into said raceway in the path of the balls and adapted to be spread by said balls, generator spring-arms electrically connected to the line spring-arms only when spread by said balls, for the purpose stated.

10. In a telephone-switchboard, a box or casing, a continuous ball-raceway therein having a vertical arm a multiple of signal-balls movable in said raceway in column, a ball-retaining device normally projecting into said raceway and adapted to retain one of said signal-balls at the top of said vertical arm.

11. In a telephone-switchboard, a box or casing, a continuous ball-raceway therein having a vertical arm, a multiple of signal-balls movable in said raceway in column, a ball-retaining device projecting into said raceway near the top of said vertical arm and retaining a ball thereat, and projecting again into said raceway in the path of a ball normally held at the bottom of said vertical arm the lower projection adapted to be lifted by a passing ball whereby to release its upper retained ball.

12. In a telephone-switchboard, the combination with a spring-jack forming terminals of the line, a connecting-plug therefor, contact-terminals adjacent the entrance to said spring-jack and leading to the operator's set, a sliding casing on the handle end of said plug, a spring interposed between said plug and casing normally holding said plug and casing extended, contact-terminals upon the inner end of the plug-casing one of which is constantly in electrical connection with one of the terminals of said plug and the other normally held out of electrical connection with the other of said plug-terminals by the spring, whereby upon the compression of the plug-casing its end terminals will contact with the terminals of the operator's set, and also contact the plug-terminals to bridge the line.

13. In an annunciator for telephone and like exchanges, a frame, a continuous ball-raceway having a lower horizontal arm joining an upwardly-inclined rear arm, which joins an upper downwardly-inclined arm which joins an approximately vertical forward arm which joins the forward end of said horizontal arm, means normally retaining a ball at the top of said vertical arm, means for releasing said ball, a column of said balls constantly filling said upwardly-inclined arm and a ball normally held in said horizontal arm and adapted to be driven against said column of balls and push the top ball of said column into the upper arm, whence it rolls forward and is retained at the top of said vertical arm, for the purpose stated.

14. The combination in an annunciator for telephonic and like exchanges with a raceway having a vertical arm or passage, confining and guiding in column a multiple of ball-signals, an electromagnet the armature of which normally retains a ball at the top of the vertical arm of said raceway, auxiliary-signal terminals located within said vertical arm normally open and adapted to be closed by the falling ball, and means for holding said terminals normally open.

15. In a telephone-switchboard and in combination with the spring-jacks forming terminals of the lines, a shelf or table, plug-seats extending through said shelf and arranged in pairs, plugs adapted to be seated therein and connected by the usual cord through the bottom of said seats, weights on said cords, of a clearing-out signal adjacent one plug-seat of each pair, consisting of a drop pivoted within an opening in said shelf and weighted on one end, and an electromagnet bridged on the plug-cord and its armature normally engaging and upholding the weighted end of the said pivoted drop.

16. In a switchboard for telephone and like exchanges and in combination with the spring-jacks forming terminals of the lines and the pairs of cord-connected connecting-plugs, of a clearing-out signal for each pair of connecting-plugs consisting of a drop pivoted about mediately of its length and weighted on one end, an electromagnet therefor bridged on the plug-cord its armature engaging and normally upholding the weighted end of said pivoted drop and adapted to release said weighted end when actuated by its magnet whereby to cause the lighter end of the pivoted drop to rise as a signal.

17. In a switchboard for telephone and like exchanges and in combination with the spring-jacks forming terminals of the lines and the cord-connected plugs, of a shelf below said jacks, a rectangular opening in said shelf, a drop pivoted therein about mediately of its length and weighted on one end, an electromagnet having an armature normally engaging and upholding said weighted end flush with the top of said shelf, a plug-seat adjacent the other end of said opening, a resetting-lever pivoted in said opening and projecting at one end into said adjacent plug-seat in the path of its descending plug, its other end adapted to engage and lift the weighted end of drop up on its engaging means when depressed at its short end by the descending plug.

18. In a switchboard for telephone and like exchanges a clearing-out signal consisting of a drop weighted on one end and pivoted about mediately of its length, a plug-seat adjacent said drop, of a resetting device for said drop consisting of a pivoted lever having a short and a long end, the short end projecting into said adjacent plug-seat in the path of the descending plug, the long end projecting in the path of the fall of the weighted end of the drop and limiting its fall and adapted when its short end is depressed by the descending plug to lift the weighted end of the drop and reset it.

19. In a switchboard for telephone and like exchanges, the combination with the spring-jacks forming terminals of the lines and the cord-connected connecting-plugs of seats for said plugs and a clearing-out signal or annunciator adjacent a plug-seat of each pair an electromagnet for each annunciator bridged on the adjacent plug-cord and adapted when energized to operate said clearing-out signal, of a device located within a plug-seat of each pair operative by the seating of the plug to break the electric connection between said magnet and the plug-cord.

20. In a plug-restored annunciator for switchboards for telephone and like exchanges, an endless ball-raceway a part whereof forms an approximately vertical arm or drop-passage, said raceway confining and guiding in column in constant succession a multiple of balls, and means whereby the balls are caused to travel in said raceway to form in succession visual signals.

21. The combination in a plug-restored annunciator for telephone and like exchanges, a casing, an endless ball-raceway therein confining and guiding in column in constant succession a multiple of balls, means whereby said balls are moved in succession in said raceway and means whereby they are presented therein one at a time as visual signals.

22. In a plug-restored annunciator for telephone and like exchanges, a casing, an endless ball-raceway therein confining and guiding in column in constant succession a multiple of balls, means for retaining some of said balls in column in a part of said raceway, means for moving them one at a time from said column, and means whereby said balls are presented one at a time in a different part of said race way to form a visual signal.

23. An annunciator device for switchboards for telephone and like exchanges, having a continuous raceway, a multiple of balls movable in said raceway, means for retaining the balls in column in a part of said raceway, means for positively moving them one at a time from said column in a continuous circuit whereby they are caused to be presented one at a time to form a visual signal.

24. An annunciator device for switchboards for telephone and like exchanges having an endless raceway, a multiple of balls movable in said raceway, means for retaining them in column in a part of said raceway, means for moving them one at a time in a continuous circuit within said raceway from top to bottom of said column, a detent for arresting them in said movement, means whereby they are released from said detent, and means whereby the released ball is caused to be presented as a visual signal in its travel in said circuit.

25. An annunciator device for switchboards for telephone and like exchanges, having a continuous raceway, a multiple of balls movable in said raceway, means for retaining said balls in column in a part of said raceway, means for moving them one at a time in a continuous circuit from said column, a detent for arresting them in said movement, means operated by the ball preceding the detent-arrested ball whereby said detent-arrested ball is caused to be presented as a visual signal in its travel in said circuit.

26. In a plug-restored annunciator for telephone and like exchanges, a casing, an endless ball-raceway therein confining and guiding in column in constant succession a multiple of balls, means whereby said balls are caused to travel in said raceway both by a projecting force and by gravity, and means whereby said balls in their travel are caused to form, one at a time, visual signals.

27. The combination in a telephone-annunciator, of an endless raceway, a multiple of balls movable therein, means for maintaining said balls in column within a portion of said raceway, means whereby said balls are projected successively from the upper end of the column, means whereby the balls so projected are caused to drop in position as visual signals, and means whereby the dropped ball is delivered to a position in alinement with the lower end of the column, and means whereby the said signal-ball is projected in contact with the lower column-ball in the operation of a traveling circuit of signal-balls.

28. In a switchboard for telephone and like exchanges, a ball-raceway leading therethrough, a multiple of plug-driven balls movable in column therein, of means for holding a ball normally retracted, means for releasing said ball to form a visual signal therein and means for engaging said ball and repositioning it in its retracted position.

29. In a switchboard, a combined spring-jack and annunciator, a casing therefor, a ball-raceway therein, a multiple of plug-driven balls movable in column therein, of electrical contacts located in said raceway for engagement by said balls and a plug adapted to fit said spring-jack and to engage said balls.

30. In a switchboard, a combined spring-jack and annunciator, a casing therefor, a plug-socket therein, a multiple of plug-driven balls movable in column therein, and a plug adapted for insertion into said spring-jack plug-socket to engage one of said balls and electrical contacts located within said socket for engagement by said ball and said plug.

31. In a telephone-switchboard, a jack-socket formed of a ball-raceway, a plug therefor, a multiple of balls movable therein, and electrical contacts located in said raceway and adapted for engagement by said balls in their successive movements.

32. In a switchboard for telephone and like exchanges, a combined jack and annunciator, a casing therefor, an endless raceway therein, a ball movable in circuit in one direction in said raceway, electrical contacts located in said raceway and adapted for engagement by said ball, and a plug adapted to fit said jack and engage said ball to drive it in its circuit.

33. A visual-signal annunciator for telephone and like exchanges consisting of a continuous raceway having a window, a ball movable in circuit within said raceway, means for retaining said ball above window, means for retaining said ball at said window, means for retaining said ball below said window, and a plug for removing said ball from its point of rest below said window to continue its circuit to its point of retention above said window.

34. In an annunciator for telephone and like exchanges, an endless raceway, a ball movable in circuit therein, means whereby said ball is caused to travel in circuit in the same direction in said endless raceway both by a projecting force and by gravity, electrical contacts in said raceway between and past which the ball is forced, and means whereby said ball is arrested in its circuit to form a visual signal.

35. The combination in an annunciator for telephone and like exchanges, of an endless raceway having a window within its circuit, an electromagnet having its armature within said circuit, a ball movable within said circuit and arrested and retained by the armature in advance of its circuitous travel to the window, means for retaining said ball as a visual signal at the window and a plug adapted to drive said ball in its circuitous path toward and from said window.

36. In an annunciator for telephone and like exchanges and in combination, an endless raceway having a window within its circuit, a ball movable in said endless raceway, an electromagnet, means carried thereby for engaging and retaining said ball at a point in advance of its travel toward the window, means for engaging and retaining said ball as a visual signal at said window, means in said raceway for retaining said ball below said window and a plug adapted to engage and drive said ball continuously within the raceway to the point at which it is again retained in advance of the window.

In testimony whereof I affix my signature in presence of two witnesses.

HOWARD FEILD JONES.

Witnesses:
 PETER D. JONES,
 HUGH L. ALLEN.